E. S. MANNY.
HOT WATER HEATER.
APPLICATION FILED JAN. 30, 1913.
1,112,462.    Patented Oct. 6, 1914.
2 SHEETS—SHEET 2.
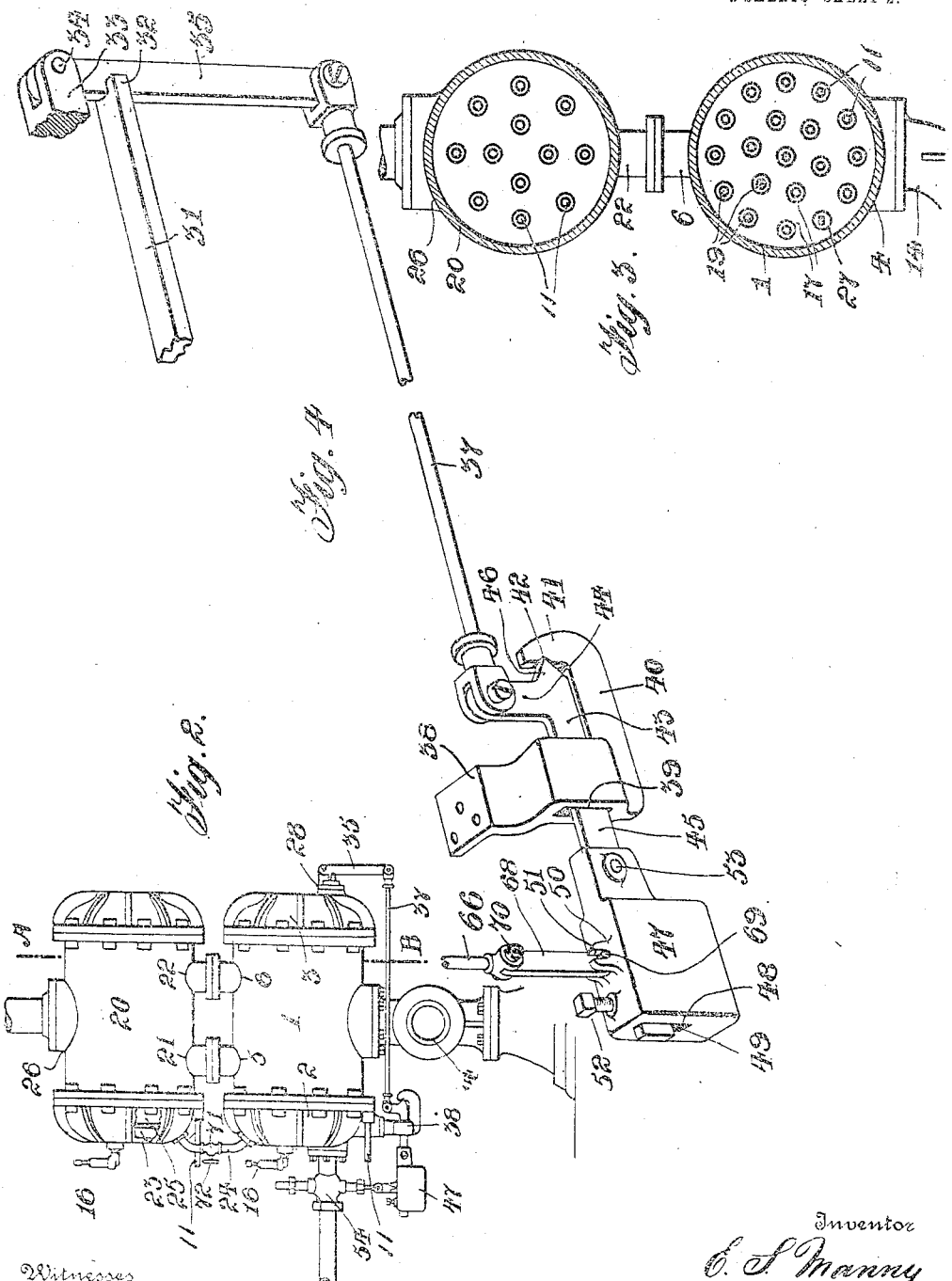

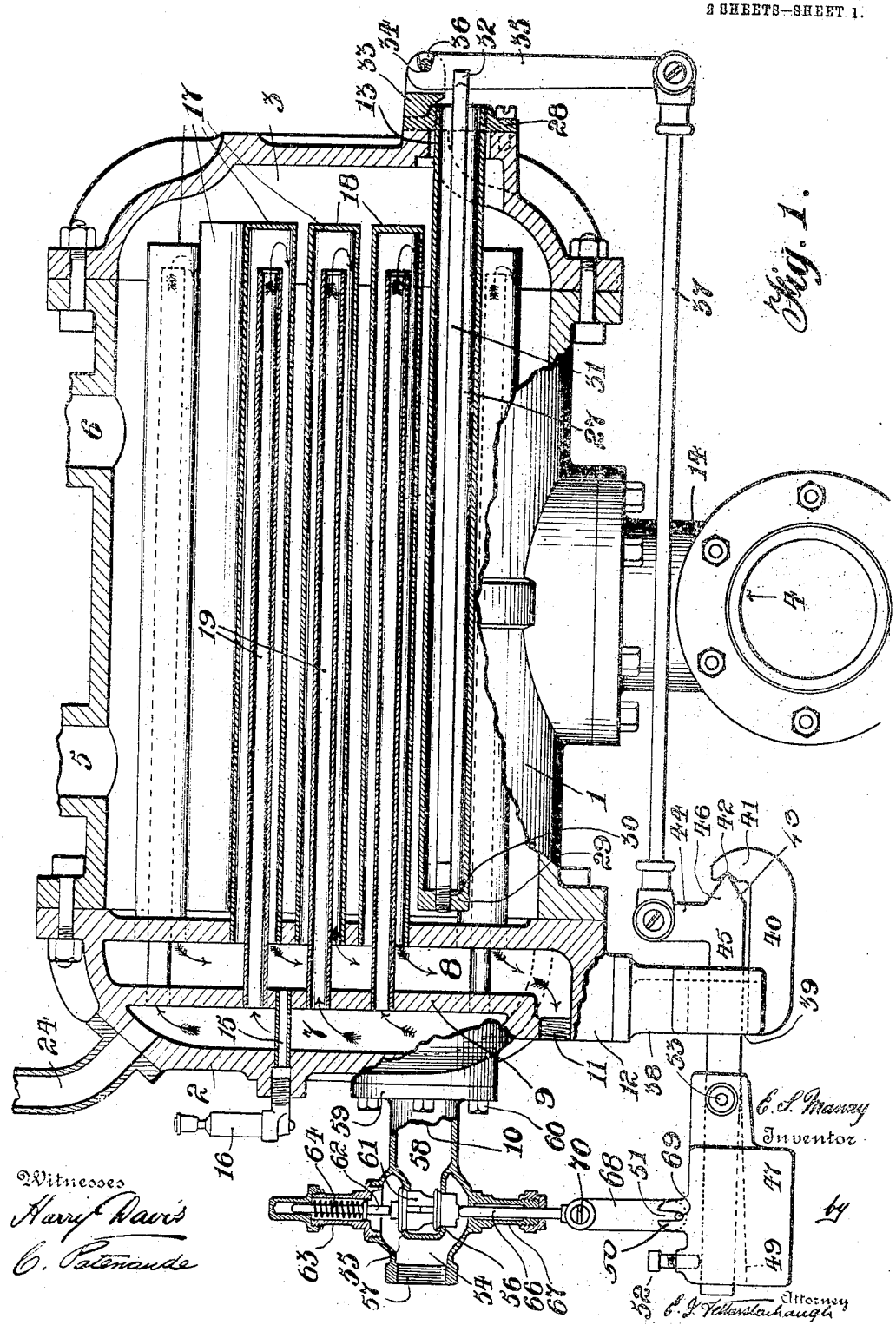

UNITED STATES PATENT OFFICE.

EUGÈNE SOLOMON MANNY, OF MONTREAL, QUEBEC, CANADA.

HOT-WATER HEATER.

1,112,462.  Specification of Letters Patent.  Patented Oct. 6, 1914.

Application filed January 30, 1913. Serial No. 745,147.

*To all whom it may concern:*

Be it known that I, EUGÈNE SOLOMON MANNY, a subject of the King of Great Britain, and a resident of the city of Montreal, in the Province of Quebec, in the Dominion of Canada, have invented certain new and useful Improvements in Hot-Water Heaters; and I do hereby declare that the following is a full, clear, and exact description of the same.

The invention relates to improvements in hot water heaters, as described in the present specification and illustrated in the accompanying drawings that form part of the same.

The invention consists essentially in the novel construction and arrangement of parts, whereby the water is thoroughly heated and maintained at a predetermined temperature.

The objects of the invention are to devise an efficient water heating device, which shall utilize the steam from a steam plant in heating the water for distribution throughout a building, and generally to provide in a simple and inexpensive manner an automatic means of controlling the supply of the heating medium.

In the drawings, Figure 1 is a longitudinal sectional view of the lower heater casing and a vertical sectional view of the inlet valve. Fig. 2 is a longitudinal sectional view of the lower and upper casings. Fig. 3 is a cross sectional view on the line A—B in Fig. 2. Fig. 4 is a perspective detail of the valve gear.

Like numerals of reference indicate corresponding parts in each figure.

Referring to the drawings, 1 is a casing, preferably cylindrical, and closed at the ends by the heads 2 and 3 and having a water inlet 4 through the under side thereof and the water outlets 5 and 6 through the upper side thereof, said head 2 forming a casing containing the steam chest 7 and the condensation chamber 8, separated by the division wall 9.

10 is a steam inlet opening to the steam chest 7.

11 is an outlet opening at the lower end of the condensation chamber 8.

12 is a lug extending downwardly from the head 2 and preferably part therewith.

13 is a tube opening toward the lower end of the head 3.

14 is a pipe rigidly secured to the water inlet 4 and connected with a suitable water supply and through which the water is fed into the casing 1.

15 is a pipe extending through the division wall 9 and into the outer wall of the head 2, leading to the air valve 16 and forming a passage for the air from the condensation chamber 8 to said air valve.

17 are pipes having the closed ends 18 and rigidly secured at their open ends in the inner wall of the head 2 and extending therethrough, said pipes communicating with the condensation chamber 8.

19 are steam pipes extending through the division wall 9 and open at both ends and communicating with the steam chest 7 and terminating at their other ends adjacent to the closed ends 18 of the pipe 17, thus the steam from the chest 7 flows through said pipes 19 and out through the open ends into the pipes 17, returning to the condensation chamber 8.

20 is a casing having the inlets 21 and 22 registering with the outlets 5 and 6 and rigidly secured, said casing containing similar pipes to the pipes 17 and 19, though fewer in number, said casing 20 having a steam chest 23 in one of its heads connected to the steam chest 7 by the pipe 24. 25 is the condensation chamber in the same head and in precisely the same arrangement as in the condensation chamber 8, this casing being for the purpose of more easily increasing the temperature of the water passing through said casing.

26 is an opening through the upper side of the casing 20 to which the distributing pipes are connected.

27 is the expansion member formed of a tube, screw threaded at its outer end into the ring 28, said ring being rigidly secured to the head 3 over the tube opening 13, the said tube passing freely through said opening and terminating in the closed end 29 with the threaded orifice 30 therethrough, said closed end being in the vicinity of the inner wall of the head 2. The tube 27 is supported entirely from the ring 28 and it will also be noticed that all the pipes are supported from one end, thus allowing for expansion and contraction without fear of damage to the pipes.

31 is a bar having the end thereof turned and screw threaded into the orifice 30, the outer end 32 of said bar extending beyond the outer end of the tube 27 in the form of a tongue.

33 is a forked lug having the pivot pin 34 across the prongs thereof and extending outwardly from the upper side of the ring 28. 35 is a link having at the upper end thereof and from the outer side the slot 36 and engaging said pivot 34 in said slot and on the inner side engaged by the outer end 32 of the bar 31.

37 is a connecting rod at one end pivotally secured at the lower end of the link 35.

38 is a bracket rigidly secured to the under side of the lug 12 and having a vertical slot 39 therethrough and an extending bar 40 at the lower end thereof, said bar 40 having the upwardly offset end 41 and the V-shaped bearing 42 in the inner wall of said offset 41.

43 is a crank lever having the short upwardly extending section 44 pivotally secured to the end of the connecting rod 37 and the horizontal long section 45 extending through the vertical slot 39 said crank lever 41 at the angle end terminating in the spear point 46, said spear point engaging in the V-shaped bearing 42, thus providing a fulcrum for the crank lever by means of which the long section 45 may be raised through the operation of the link 35 and its connection with the bar 31.

47 is a weight having a slot 48 therethrough from end to end, said slot having the inclined bed 49.

50 are lugs extending from the upper side of the weight 47 and having the vertical slots 51 therein from the upper side thereof.

52 is a set screw threaded into the upper side of the weight 47 toward the outer end thereof and extending through to the slot 48.

53 is a pivot through the reduced inner end of the weight 47 and securing the weight to the long section 45 of the crank lever, said crank section 45 extending through the slot 48 and engaged by the set screw 52.

54 is a valve casing having a double seat 55 and 56 and the inlet 57 connected to a suitable steam supply on the one side of said seats and the outlet 58 on the other side of said seats leading into the steam inlet opening 10, said valve casing at the extremity of the outlet passage 58 having a flange 59 rigidly secured around said steam inlet opening 10 by the cap screws 60. 61 is a valve engaging the seats 55 and 56 and having the stem 62 projecting upwardly into the reduced end 63 of said valve casing.

64 is a spiral spring encircling the valve stem 62 and holding the valve 61 down on to its seats. The reduced upper end 63 of the valve casing is closed in by the removable cap 65.

66 is a rod extending upwardly in the reduced lower end 67 of the valve casing and engaging the bottom of the valve 61 for the purpose of opening said valve, said rod 66 extending downwardly below the said reduced end 67 and suitably packed.

68 is a link having laterally extending pins 69 at the lower end thereof engaging at the bottom of the vertical slots 51 and at the upper end thereof secured to the lower end of the rod 66 by the pin 70.

In the operation of this invention, the water is fed through the inlet 4 and spreads over the interior of the casing 1 around the pipes 17, branching at each side and leaving said casing through the outlets 5 and 6 into the second casing 20 and through said second casing 20 around the pipes in said casing to the outlet 26 and so on into the distributing pipes through the building to be heated and then back to the casing 1. The water is heated by means of the steam entering the steam pipes in each casing from the steam chest at the end thereof, said steam flowing through said steam pipes into the encircling pipes and back to the condensation chambers, thus heating the water passing around said pipes. So long as the water remains cool, the valve 61 is open and allows the ingress of steam as the tube 27 is then in its contracted position, which moves the bar 31 outwardly and pushes the link 35, said link swinging on its pivot and drawing at its lower end the connecting rod 37 which pulls on the crank lever 43 and pulling on said crank lever 43 raises the long section 45 of the lever and through the link 68 and rod 66 raising the valve 61 to its open position against the pressure of the spring 64. As soon as the water becomes very hot the metal of the tube 27 expands and draws with it in its expansion the bar 31. This releases the link 35 and the weight 47 then brings the long section 45 of the crank lever to its original horizontal position, thus permitting the spring 64 to close the valve 61.

It will be seen that the steam passes from the chest 7 to the chest 23 through the pipe 24, though there is a valve 71 operated by a suitable hand wheel 72 for cutting off the steam connection between the two casings in mild weather.

What I claim is—

1. In a device of the class described, a hot water casing having a plurality of steam heating pipes therein contained and a steam inlet leading to said pipes, a steam feed pipe leading to said steam inlet, a spring closed valve introduced in said steam feed pipe, a weighted member, a rod connected with said weighted member and projecting upwardly therefrom and engaging said valve, a lever connected with said weighted member and offset at one end and suitably fulcrumed, an arm pivotally secured to said hot water casing at the opposite end from said valve, a connecting rod pivotally joining said arm and said offset, an expansion tube open at its outer end and extending beyond the wall of said hot water casing from the interior thereof and an inner longitudinal member screwthreaded into the closed end of said expansion tube and extending outwardly beyond the open end and engaging said arm intermediate of the length thereof.

2. In a device of the class described, in combination, a water casing having an inlet and an outlet and a steam inlet, steam heating means within said casing connected with said steam inlet, an expansion member formed of a tube closed at the inner end and supported at its open outer end by a ring secured to the casing on the outer side and a bar screwed to the inner closed end of the tube and projecting outwardly beyond the outer end of said tube in the form of a tongue, a link pivotally secured at its upper end from the casing above said tongue and engaged thereby, a bracket supported from the other end of said casing having a vertical slot therethrough and a bar at the lower end thereof upwardly offset at the end and forming a V-shaped bearing in the inner wall of the offset, a crank lever having short vertical section, a long horizontal section extending through said vertical slot and a spear shaped end at the angle corner engaging in said V-shaped bearing, a connecting rod pivotally joining the vertical section of said crank lever to said link, a weight having a longitudinal slot therethrough and an inclined bed to said slot and at the upper end of said weight lugs having vertical slots therein from the top, said weight being pivotally secured on the horizontal section of said crank lever, a valve casing communicating with the steam inlet to said casing having a double seat therein, a valve correspondingly formed and spring-held to said seats, a rod extending upwardly into said valve chamber and engaging the lower end of said valve, a link having lateral pins from the lower portion of the sides thereof engaging in said vertical slots in the weight lugs and at its upper end secured to said rod extending into the valve chamber and a set screw inserted in the correspondingly threaded orifice in the weight from the top and engaging the upper side of the horizontal section of the crank lever.

Signed at the city of Montreal, Quebec, Canada, this 21st day of December, 1912.

EUGÈNE SOLOMON MANNY.

Witnesses:
M. PATENAUDE,
HARRY DAVIS.